United States Patent [19]

Crowell et al.

[11] Patent Number: 4,718,049

[45] Date of Patent: Jan. 5, 1988

[54] PRE-LOADED VIBRATOR ASSEMBLY WITH MECHANICAL LOCK

[75] Inventors: John M. Crowell, Friendswood; James E. Teske, Arcadia, both of Tex.

[73] Assignee: Western Atlas International, Inc., Houston, Tex.

[21] Appl. No.: 821,905

[22] Filed: Jan. 23, 1986

[51] Int. Cl.⁴ ............................................. H04R 11/00
[52] U.S. Cl. ..................................... 367/189; 181/121
[58] Field of Search ............... 181/113, 114, 119, 121, 181/401; 367/142, 143, 173, 176, 189, 190

[56] References Cited

U.S. PATENT DOCUMENTS

| | | | |
|---|---|---|---|
| 3,282,372 | 11/1966 | Brown et al. | 181/121 |
| 3,306,391 | 3/1964 | Bays | 367/189 |
| 3,349,867 | 10/1967 | Mounce | 181/119 |
| 3,363,720 | 1/1968 | Mifsud et al. | 181/114 |
| 3,777,843 | 12/1973 | Fair et al. | 181/114 |
| 3,866,709 | 12/1975 | Mifsud | 181/114 |
| 4,014,403 | 3/1977 | Mifsud | 181/114 |
| 4,064,964 | 12/1977 | Norden | 181/121 |
| 4,135,598 | 1/1979 | Stafford | 181/114 |
| 4,248,324 | 2/1981 | Mifsud | 181/121 |
| 4,253,538 | 3/1981 | Weber et al. | 181/119 |
| 4,410,062 | 10/1983 | Mifsud | 181/121 |
| 4,506,758 | 5/1985 | Fair | 181/119 |

FOREIGN PATENT DOCUMENTS 0178748 4/1986 European Pat. Off. ............ 367/189

*Primary Examiner*—Deborah L. Kyle
*Assistant Examiner*—Brian S. Steinberger
*Attorney, Agent, or Firm*—Barry C. Kane

[57] ABSTRACT

A preloaded vibrator assembly wherein each leg of a stilt structure is preloaded in compression during construction. The linear actuator is preloaded prior to operation by supplying hydraulic fluid under pressure between one end of the linear actuator piston and the hub of the stilt-structure spider. A structural deflection of the spider away from the piston rod is created by the hydraulic pressure. At a predetermined load, a mechanical lock is engaged, fixing the relative positions of the spider and the piston rod. Hydraulic pressure is removed leaving the structure preloaded.

6 Claims, 6 Drawing Figures

U.S. Patent    Jan. 5, 1988    Sheet 1 of 3    4,718,049
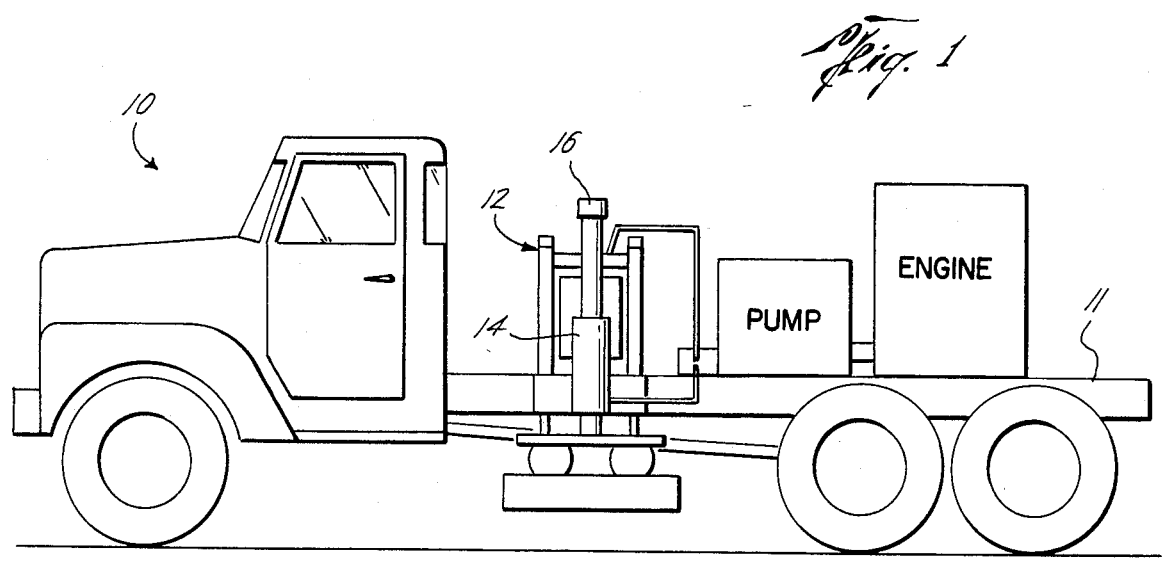
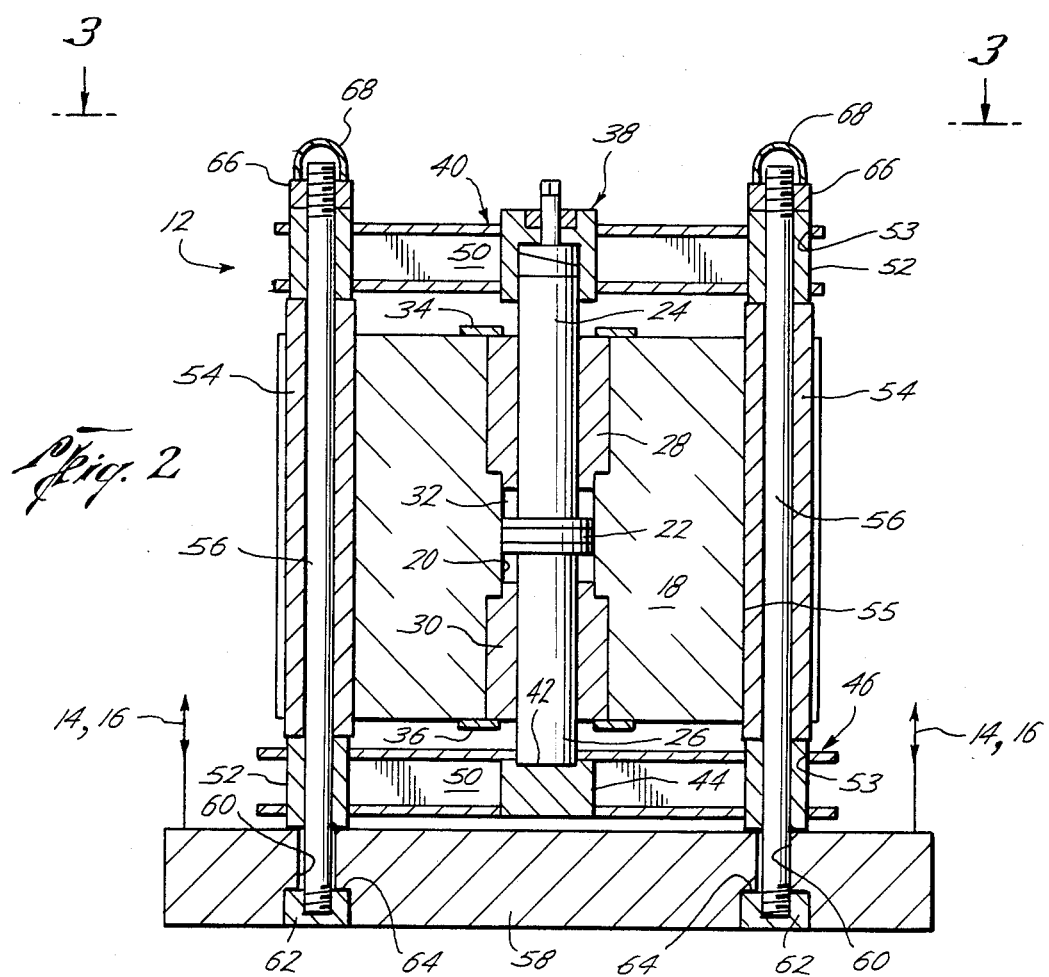

PRE-LOADED VIBRATOR ASSEMBLY WITH MECHANICAL LOCK

BACKGROUND OF THE INVENTION

1. Field of the Invention

This invention relates to seismic sources and particularly to vibrators having pre-loaded assemblies.

2. Discussion of the Related Art

Conventional seismic vibrators consist of a dual-ended linear actuator disposed above a ground contacting base plate by a support frame called a stilt structure. The stilt structure typically consists of 4 I-beam legs, each having one end rigidly connected to the base plate. The opposite ends of each leg are terminated in horizontal flanges welded thereto. A cross member, often called a spider, of I-beam steel is fastened to the top of each leg by a plurality of bolts. At a predetermined distance below the top cross member is a lower cross member welded to each leg. The linear actuator is constrained between the upper and lower cross members.

After numerous hours of operation the stilt structure described above often suffers structural failures. Most often, structural failure occurs at or near the welded connections and is caused by dynamic external loads generated by the linear actuator. The reciprocating motion of the linear actuator induces bending moments in the upper and lower cross members which in turn are partially passed to the legs.

It was discovered that structural failures could be reduced by preloading the stilt structure. A conventional preload technique involves placing spacers or shims between the upper cross member and the linear actuator piston, thus creating a gap between the connection of the upper cross member to each leg. Closing the gap in the connection by tightening the bolts, results in preloading the linear actuator piston in compression. The upper and lower cross members essentially trap the linear actuator therebetween.

A major disadvantage to the above preloading technique is that the upper cross member must be physically removed in order to change the number of shims and thus changing the amount of preload on the stilt structure.

A second disadvantage in the above technique occurs when the operating range of the system is changed, so must the amount of preload on the structure. The number of shims required to achieve the new preload can be empirically determined; however, the mechanics involved in testing is cumbersome.

Another disadvantage is in setting the proper gap between each leg and the cross member. The incorrect number or size of shims will result in an under-or over-preloaded stilt structure and a reduction in the operating life.

SUMMARY OF THE INVENTION

It is an object of this invention to provide a vibrator stilt structure less susceptible to structural failures.

It is an another object of this invention to provide a stilt structure where the amount of preload may be quickly altered without disassembling the structure.

It is yet another object of this invention to provide a new stilt structure which has a fewer number of welded connections.

In accordance with an aspect of this invention each leg of the stilt structure is hollow for receiving a tie rod therethrough. Each tie rod securely interconnects the base plate and cross member, fixing each leg therebetween.

In accordance with another aspect of this invention, annular spacers are inserted between each tie rod and the surrounding stilt leg to prevent the tie rod from resonating.

In accordance with yet another aspect of this invention, each tie rod is prestressed during assembly, preloading each stilt leg in compression.

In accordance with still another aspect of this invention a hydraulic preload device is disposed between the cross member and linear actuator piston rod so as to place the piston rod and cross member in variable amounts of preload. A mechanical lock is engaged to maintain the level of preloading when the hydraulic pressure is released.

BRIEF DESCRIPTION OF THE DRAWINGS

A better understanding of the benefits and advantages of my invention may be obtained from the appended detailed description and the drawings, wherein:

FIG. 1 is an elevational view of a vibrator truck;

FIG. 2 is a front elevational view of the vibrator assembly;

DETAILED DESCRIPTION OF THE PREFERRED EMBODIMENT

Figure 3:
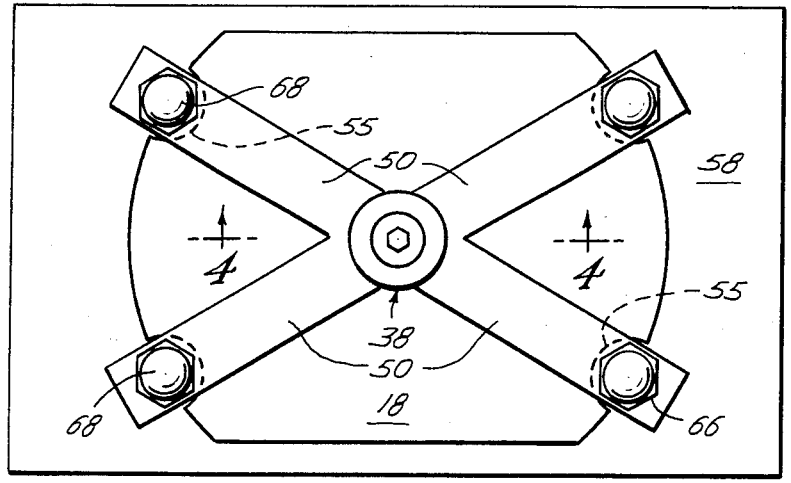
FIG. 3 is a plan view of the vibrator assembly.

FIG. 1 is a side-view diagram of a vehicle such as a truck 10 including a chassis 11 having a vibrator assembly 12 centrally mounted thereon. Hydraulic jacks 14 and columns 16 raise and lower the assembly 12 with respect to the truck 10.

FIG. 2 is a front elevational view of the vibrator assembly 12. The hydraulic jacks 14 and columns 16 are indicated by arrows 14 and 16. As shown in FIG. 2, the vibrator assembly 12 includes a reaction mass 18 having a centrally disposed cylinder 20 extending vertically therethrough. A piston 22 having opposing piston rods 24 and 26 is slidably received within cylinder 20. Piston 22 is enclosed within cylinder 20 by cylinder sleeves 28 and 30 received within cylinder 20 and around piston rods 24 and 26, forming a chamber 32. Sleeves 28 and 30 are retained within cylinder 20 by collars 34 and 36, respectively, connected to the reaction mass 18.

The free end of piston rod 24 is retained by a manifold 38 forming the hub of an upper cross member or spider 40. The free end of piston rod 26 is retained in a socket 42 within the hub 44 of a lower spider 46. It is preferred that each spider 40 and 46 have four arms generally indicated as 50 radiating in a common plane from the hub; however, two or more arms or a circular plate may be used.

Referring to FIGS. 2 and 3, the free end of each arm 50 is terminated by a vertically disposed tube indicated as 52 extending through a hole 53 therein. The axis of each tube 52 is parallel to the axis of cylinder 20 within the reaction mass 18. The upper and lower spiders 40 and 46 are arranged so that the arms 50 and tubes 52 are vertically aligned with each other. Disposed between the upper and lower spider 40 and 46 and axially aligned with tubes 52 of each cross member are tubular stilt legs 54. The stilt legs 54 are partially enclosed within channels 55 in the reaction mass. Each stilt leg 54 is held in axial alignment with tubes 52 by a tie rod 56 extending therethrough. A base plate 58 slidably receives the lower end of each tie rod 56 through holes 60, placing the lower spider 46 adjacent the base plate. The lower ends of each tie rod 56 are fixed within the base plate 58 by end nuts 62 retained within sockets 64 in the bottom of the base plate 58. The opposite ends of tie rods 56 extending through the upper spider 40 receive a nut 66 and a thread-protective cap 68.

During the assembly, each tie rod 56 is prestressed by using a hydraulic tensioning tool which stretches each tie rod. For example, each tie rod may have a 55,000 pound (lb.) tensional force applied by the tensioning tool. Each nut 66 is tightened when the tensional force is reached, i.e. prestressing each tie rod 56 and causing a compressive load on each stilt leg 54 and on the tubes 52 of each spider 40 and 46. The amount of preload placed on each tie rod is dependent upon the diameter and the tensile strength of the tie rod. It is preferred that the amount of tensile force applied provide a 5 to 1 safety factor. For example, a steel rod that would fail at 250,000 lbs. of tensional force may be tensionally prestressed to 50,000 lbs. of force.

Figure 4:
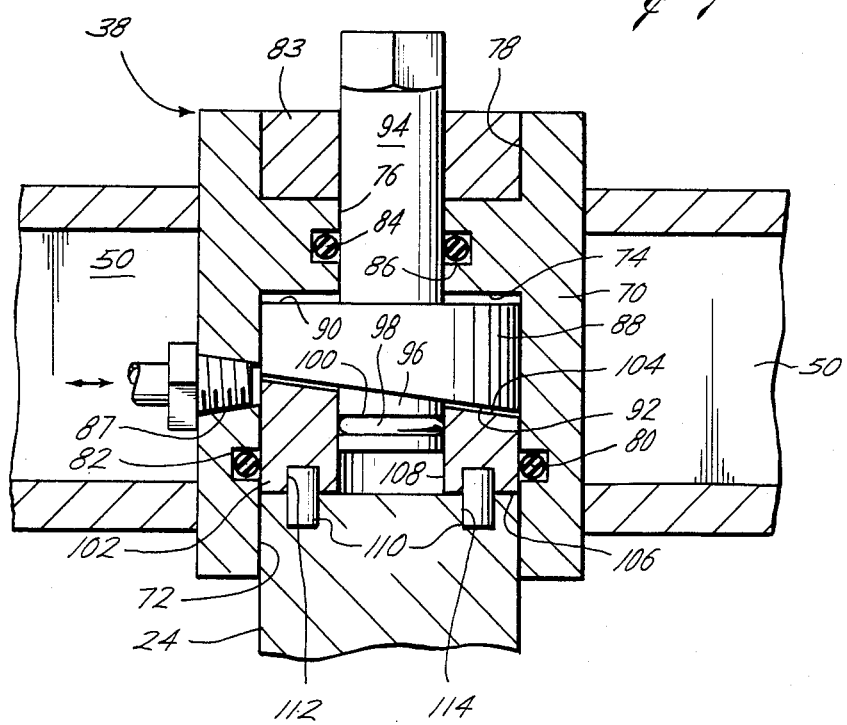
FIG. 4 is an enlarged elevational view in cross-section of the pre-load device.

FIG. 4 is an enlarged elevational view of the manifold 38. In general, manifold 38 includes a housing 70 forming the hub of the spider arms 50. The housing 70 has a lower axial bore 72 therein slightly larger in diameter than that of the upper piston rod 24. For example, the difference in diameters may be 0.005 inch. An end wall 74 of bore 72 has an axial hole 76 therein placing bore 72 in communication with an axial bore 78 contained in the upper end of housing 70. Housing 70 also includes an O-ring 80 retained within an annular channel 82 in the wall of bore 72. A second O-ring 84 is retained within an annular channel 86 in the wall of hole 76. A hydraulic inlet/outlet port 87 tranversely extends through housing 70 and into bore 72.

A disc 88 having a horizontal upper face 90 and a helical lower face 92 is concentrically received within bore 72. A cylindrical stem 94 extends from the horizontal face 90 of disc 88 and extends through hole 76 and out bore 78. A stem-locking device 83 is disposed within bore 78 and around stem 94. O-ring 84 forms a seal against stem 94. The helical face 82 has a stem 96 extending therefrom having a diameter equal to stem 94. The length of stem 96 is substantially less than stem 94 and retains an O-ring 98 in an annular groove 100 near the free end. The surface areas of the end wall 74 in bore 72, face 90, and of the projections of face 92 of disc 88 on the horizontal plane are equal.

A second disc 102 having a helical upper face 104, a horizontal lower face 106, and an axial hole 108 extending therethrough is received within bore 72 such that helical face 104 mates with helical face 82 of disc 88. O-ring 80 in housing 70 forms a concentric seal around disc 102 and O-ring 98 on stem 96 forms a concentric seal within axial hole 108 of disc 102. The lower face 106 of disc 102 is in intimate contact with the free end of piston rod 24 partially received within bore 72. Disc 102 is held in fixed relation thereto by pins 110 retained in holes 112 and 114 in the disc 102 and piston rod 24, respectively.

Figure 5:
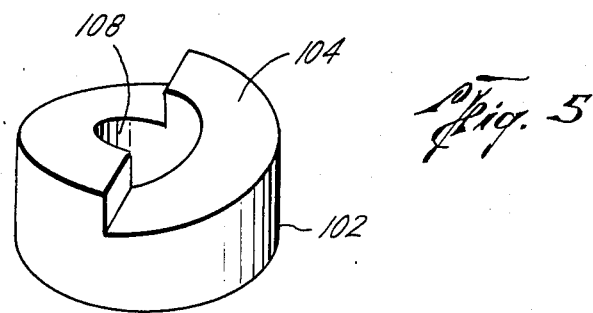
FIG. 5 is a perspective view of one helical disc.

FIG. 5 is a perspective view of helical disc 102. The upper face 104 has a double-helix configuration that mates with face 92 of disc 88. Although a double-helical configuration is shown, it is understood that any preferred number of helical surfaces, such as that shown in the Figure, may be employed.

Figure 6:
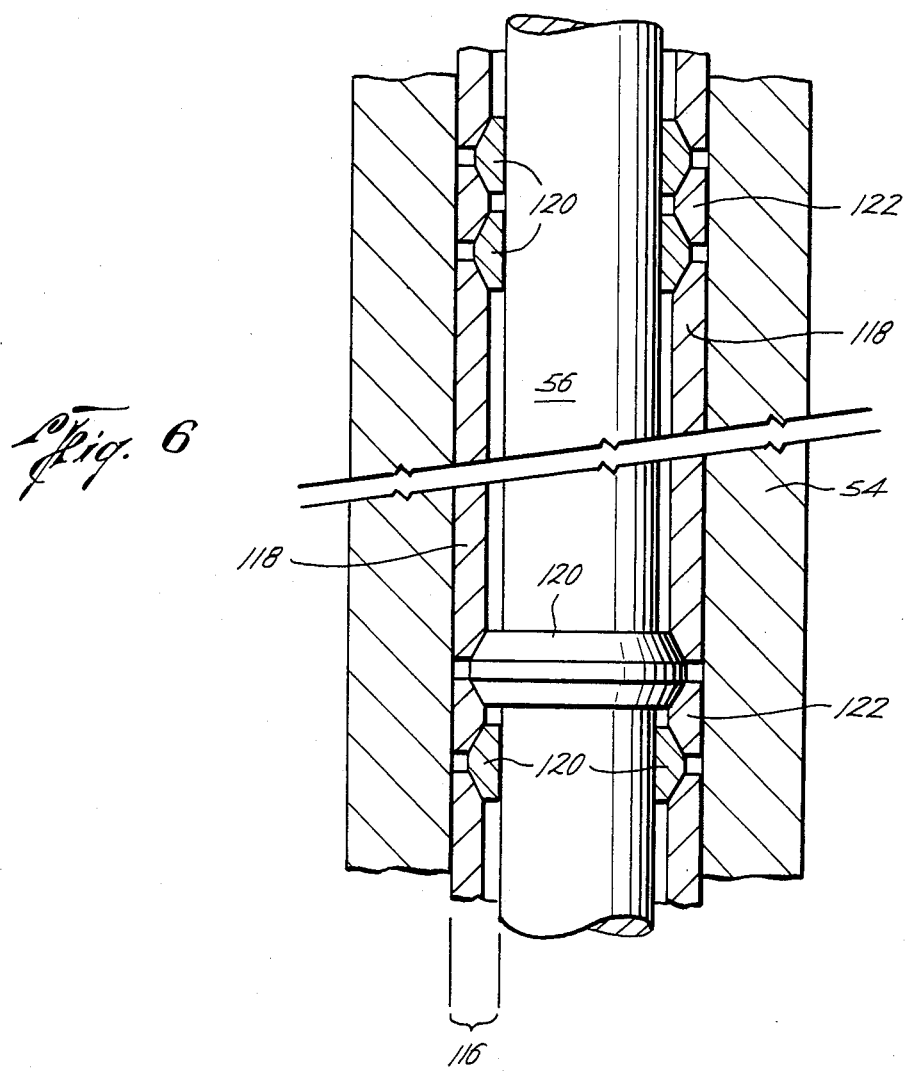
FIG. 6 is an enlarged elevational view in cross-section of one stilt structure leg.

FIG. 6 is an enlarged elevational view in cross section of a portion of a stilt leg 54 and enclosed tie rod 56. It can be seen in the Figure that an annular space 116 between tie rod 56 and the inside diameter (I.D.) of leg 54 is occupied by a plurality of shims 118 between which are a set of 3 split damper rings 120 and 122. Split rings 120 have an I.D. that fits tightly around the outside diameter (O.D.) of tie rod 56. The O.D. of split ring 120 is less than the I.D. of stilt leg 54 and has outwardly-beveled edges. Shims 118 and split rings 122 have an O.D. equal to the I.D. of stilt legs 54 and I.D. greater than the O.D. of tie rods 56. The outer edges of the I.D. of the shims 118 and split rings 122 are beveled so as to wedge against the beveled edges of split rings 120. The number of shims 118 and rings 120 and 122 used within stilt leg 54 are such that the tie rod 56 is clamped at three equidistance points along its length by split rings 120. When the tie rods are prestressed, the shims 118 and split rings 120 and 122 are compressed lengthwise between legs 54 and tie rods 56, wedging against each other and fixing tie rod 56 within each stilt leg 54.

In operation, the vibrator assembly 12 is transported by a desired vehicle 10 to a predetermined location. The base plate 48 is placed in contact with the ground vehicle by well known hydraulic jacks and the weight of the vehicle is added to the force holding the base plate to the ground to prevent decoupling. Prior to operation, hydraulic fluid under pressure is injected through port 87 into cylinder 72 within housing 70 forcing housing 70 and disc 102 axially apart. A structural deflection of the spider away from the piston rod is created by the hydraulic pressure between disc 102 and end wall 74. Since the surface area of the disc face 90 is equal to the horizontal component of the surface area of face 92, disc 88 is pressure balanced within bore 72. At a predetermined hydraulic pressure, a force is manually applied to stem 94 turning disc 88 relative to disc 102 urging helical faces of the discs in contact with each other and fixing the position of the housing 70 with respect to the upper piston rod 24. This hydraulic expansion preloads the piston rods 24 and 26 in compression with the upper and lower spiders 40 and 46. After the helical lock is in place, hydraulic pressure is removed. The helical disc 88 is locked in place by stem locking device 83 such as model RFN7012, manufactured by the Ringfeder Corp. of Westwood, N.J. The vibrator is then operated in a normal manner.

Tube shims 118 and split rings 120 and 122 are compressed lengthwise against each other when the tie rods 56 are prestressed. The lengthwise compression solidly fixes the position of rod 56 within each stilt leg 54. The distance between subsequent split rings 120 damps any possible vibration in each tie rod. That is to say that the spacing between the split rings merely serves to tune the tie-rod vibration frequency to selected values different from the natural frequency of the structure taken as a whole. It is preferred that the split ring spacing be such as to prevent the tie-rods from vibrating in the low end of the vibrator operating range, such as 5 to 20 Hertz. Thus, with vibration reduced, the life expectancy of each tie rod is increased. The shims 118 and rings 120 and 122 also serve to reduce any vibration present in the stilt legs 54.

In an alternate embodiment of this invention, the reaction mass 18 has a plurality of off-axial holes therein for receiving the stilt legs 54 therethrough. Anti-rotation bushings are fixed within each off-axial hole to prevent the reaction mass from rotating and binding on the stilt legs 54.

In another alternate embodiment of this invention, the lower piston rod 26 many be centrally connected directly to the base plate 58, eliminating the lower spider 46. The stilt legs 54 are then disposed between upper spider 40 and the base plate 58 and connected in the manner outlined above.

For illustrative purposes, my invention has been described with a certain degree of specificity. Variations will occur to those skilled in the art but which may be included within the scope and spirit of this invention which is limited only by the appended claims.

We claim as our invention:

1. A prestressed vibrator assembly including a linear actuator having a dual-ended piston rod, at least one end of said piston rod having a spider attached thereto, and a baseplate disposed below said linear actuator and said spider, comprising:
    (a) a plurality of legs radially disposed around and parallel to said linear-actuator piston rod;
    (b) means for interconnecting said spider to said base plate, said means also placing said leg under a compressive preload;
    (c) means disposed between one end of said linear actuator and said spider for preloading said piston rod; and
    (d) annular means disposed within said legs for fixing said interconnecting means therein.

2. An assembly as recited in claim 1, wherein said interconnecting means comprises a plurality of tie rods, each extending through one of said legs and having threaded portions at each end.

3. An assembly as recited in claim 1, wherein said annular means, comprises:
    (a) at least one ring received along each of said tie rods;
    (b) at least two shims having a predetermined length received along said tie rods on each side of said ring, so that said ring and said shims are in intimate contact with each other, wedging said ring and said shims against each other between said tie rods and said legs, physically locating said tie rods within said legs.

4. An assembly as recited in claim 1, wherein said piston rod preloading means, comprises:
    (a) means for expanding the connection between said spider and said piston rod, forcing said piston rod away with respect to said spider; and
    (b) helical means for maintaining the expanded relationship of said piston rod with said spider.

5. An assembly as recited in claim 4, wherein said expanding means, comprises:
    (a) a housing coupled to said spider having a bore therein partially receiving one end of said piston rod; and
    (b) means for introducing a fluid under pressure to said bore forcing said piston rod out of said bore.

6. An assembly as recited in claim 5, wherein said maintaining means, comprises:
    (a) a first and a second disc concentrically disposed within said bore of said housing, said discs having substantially identical helical end-faces in intimate contact with each other, said first disc coupled to the end of said piston rod within said housing;
    (b) means for rotating said second disc relative to said first disc, forcing said helical faces to wedge said discs apart within said bore between said housing and said piston rod; and
    (c) means for locking said second disc in fixed relationship to said first disc.

* * * * *